United States Patent
Tsuzuki et al.

(10) Patent No.: US 11,591,235 B2
(45) Date of Patent: Feb. 28, 2023

(54) METHOD FOR PRODUCING METAL OXIDE NANOPARTICLES

(71) Applicants: FURUKAWA ELECTRIC CO., LTD., Tokyo (JP); NATIONAL INSTITUTE FOR MATERIALS SCIENCE, Tsukuba (JP)

(72) Inventors: Yoshikazu Tsuzuki, Tokyo (JP); Mariko Wakae, Tokyo (JP); Kazuhiko Kurusu, Tokyo (JP); Hideki Abe, Tsukuba (JP)

(73) Assignees: FURUKAWA ELECTRIC CO., LTD., Tokyo (JP); NATIONAL INSTITUTE FOR MATERIALS SCIENCE, Tsukuba (JP)

( * ) Notice: Subject to any disclaimer, the term of this patent is extended or adjusted under 35 U.S.C. 154(b) by 330 days.

(21) Appl. No.: 16/751,075

(22) Filed: Jan. 23, 2020

(65) Prior Publication Data

US 2020/0156956 A1    May 21, 2020

Related U.S. Application Data

(63) Continuation of application No. PCT/JP2018/021638, filed on Jun. 6, 2018.

(30) Foreign Application Priority Data

Jul. 24, 2017   (JP) .............................. JP2017-142908

(51) Int. Cl.
   *C01G 3/02*        (2006.01)
   *C01B 13/26*       (2006.01)
   (Continued)

(52) U.S. Cl.
   CPC .......... *C01F 17/247* (2020.01); *C01B 13/366* (2013.01); *C01F 17/235* (2020.01); *C01G 3/02* (2013.01); *C01P 2004/64* (2013.01)

(58) Field of Classification Search
   CPC .......... C01B 13/36; C01B 13/366; C01G 3/02
   See application file for complete search history.

(56) References Cited

U.S. PATENT DOCUMENTS

2009/0208398 A1    8/2009  Li et al.
2009/0269269 A1*  10/2009  White ................... B82Y 30/00
                                               977/777
(Continued)

FOREIGN PATENT DOCUMENTS

CN    1817801 A    8/2006
CN    1962462 A    5/2007
(Continued)

OTHER PUBLICATIONS

Machine translation of Yamaguchi (JP2009/007235), publication date Jan. 15, 2009.*

(Continued)

*Primary Examiner* — Jun Li
(74) *Attorney, Agent, or Firm* — Birch, Stewart, Kolasch & Birch, LLP

(57) ABSTRACT

The present disclosure relates to a method for producing metal oxide nanoparticles includes a first step of preparing a reaction solution containing a metal complex, an alcohol, and water; a second step of heating the reaction solution for phase-separation under a hermetically sealed atmosphere where the volumetric expansion ratio of the reaction solution reaches 5 to 15%; a third step of holding the reaction solution heated in the second step for 30 minutes or more for dehydrating the metal complex to precipitate the metal oxide nanoparticles; and a fourth step of collecting the metal oxide nanoparticles after the metal oxide nanoparticles are cooled.

3 Claims, 2 Drawing Sheets

(51) Int. Cl.
    *C01F 17/235*      (2020.01)
    *C01F 17/247*      (2020.01)
    *C01B 13/36*      (2006.01)

(56) References Cited

U.S. PATENT DOCUMENTS

| | | |
|---|---|---|
| 2010/0233074 A1 | 9/2010 | Song et al. |
| 2010/0283377 A1 | 11/2010 | Li et al. |

FOREIGN PATENT DOCUMENTS

| | | | |
|---|---|---|---|
| CN | 101830496 A | 9/2010 | |
| CN | 102849778 A | 1/2013 | |
| CN | 103864139 A | 6/2014 | |
| CN | 105536791 A | 5/2016 | |
| JP | 2008024524 A * | 2/2008 | ............ B82Y 30/00 |
| JP | 2009-7235 A | 1/2009 | |
| JP | 2010-195654 A | 9/2010 | |
| JP | 2010-208930 A | 9/2010 | |
| JP | 2013-240756 A | 12/2013 | |
| WO | WO 2009/102727 A2 | 8/2009 | |
| WO | WO 2009/102727 A3 | 8/2009 | |
| WO | WO 2009/102727 A8 | 8/2009 | |
| WO | WO 2015/196867 A1 | 12/2015 | |

OTHER PUBLICATIONS

Machine translation of Hashimoto (JP2008-024524), publication date Feb. 7, 2008.*

Nikam et al. (pH-Dependent Single-Step Rapid Synthesis of CuO and Cu2O Nanoparticles from the Same Precursor, Cryst. Growth Des. 2014, 14, 4329-4334).*

Feldmann (Polyol-Mediated Preparation of Nanoscale Oxide Particles, Angew. Chem. Int. Ed. 2001, 40 No. 2, p. 359-362).*

Cheng et al. (Facile synthesis and morphology evolution of magnetic iron oxide nanoparticles in different polyol processes, New J. Chem., 2011,35, 1072-1079).*

Chinese Office Action and Search Report for Chinese Application No. 201880043316.5, dated Sep. 27, 2021, with English translation of the Office Action.

Lihui, "Controllable Synthesis and Formation Mechanism of Micron Copper Oxide," Journal of Chuzhou University, vol. 15, No. 2, Apr. 2013, pp. 69-72 (15 pages total), with English translation.

Japanese Notice of Reasons for Refusal for Japanese Application No. 2019-532420, dated Jan. 17, 2022, with an English translation.

Extended European Search Report for European Application No. 18838954.8, dated Apr. 7, 2021.

Hong et al., "A convenient alcohothermal approach for low temperature synthesis of CuO nanoparticles", Materials Letters, vol. 52, No. 1-2, Jan. 2002, pp. 34-38.

Reverberi et al.. "Synthesis of copper nanoparticles in ethylene glycol by chemical reduction with vanadium (+2) salts", Materials, vol. 9, No. 10, Sep. 2016, pp. 1-11.

Umer et al. "Selection of a suitabie method for the synthesis of copper nanoparticles", NANO: Brief Reports and Review, vol. 7, No. 5, Oct. 2012, pp. 1230005-1-1230005-18.

International Preliminary Report on Patentabiltiy and English translation of the Written Opinion of the International Searching Authority (Form PCT/IB/373 and PCT/ISA/237) for International Application No. PCT/JP2018/021638, dated Jan. 28, 2020.

International Search Report for PCT/JP2018/021638 (PCT/ISA/210) dated Aug. 28, 2018.

Written Opinion of the International Searching Authority for PCT/JP2018/021638 (PCT/ISA/237) dated Aug. 28, 2018.

* cited by examiner

METHOD FOR PRODUCING METAL OXIDE NANOPARTICLES

CROSS REFERENCE TO RELATED APPLICATIONS

This is a continuation application of International Patent Application No. PCT/JP2018/021638 filed Jun. 6, 2018, which claims the benefit of Japanese Patent Application No. 2017-142908 filed Jul. 24, 2017, and the full contents of all of which are hereby incorporated by reference in their entirety.

BACKGROUND

Technical Field

The present disclosure relates to a method for producing metal oxide nanoparticles.

Description of the Related Art

Metal oxide nanoparticles have been used recently in various fields such as various catalysts, wiring materials and electrode materials produced using nanoink, additive materials for electronic components such as capacitors, and sensors utilizing optical performance. From such metal oxide nanoparticles, finely dividing particles is required.

For example, as a purifying catalyst for purifying nitrogen oxides ($NO_x$), which are primary toxic components of exhaust gas emitted from automobiles and the like using fossil fuel, a copper oxide nanocrystalline powder oriented with the (001) plane is known to exert excellent catalytic performance (Patent Literature 1).

With a hydrothermal reaction as described in Japanese Patent Application Laid-Open No. 2013-240756, which has been commonly used conventionally, however, an intended copper oxide may not be obtained depending on the temperature. Even when the intended copper oxide is obtained, it has been difficult to obtain a high yield efficiently. Moreover, in a conventional hydrothermal reaction, metal ions are surrounded by hydrated ions in the solution, and hydrate-based nanoparticles are likely to precipitate. Additionally, even after metal oxide nanoparticles are produced by dehydration of the hydrate, hydrate nanoparticles are mixed. For this reason, separation and recovery of metal oxide nanoparticles and hydrate-based nanoparticles have been difficult, and thus, high purity aggregates of metal oxide nanoparticles could not be obtained.

SUMMARY

The present disclosure is related to providing a method for producing metal oxide nanoparticles, capable of stably synthesizing metal oxide nanoparticles in a high yield.

According to an aspect of the present disclosure, a method for producing metal oxide nanoparticles includes a first step of preparing a reaction solution containing a metal complex, an alcohol, and water; a second step of heating the reaction solution for phase-separation under a hermetically sealed atmosphere where a volumetric expansion ratio of the reaction solution reaches 5 to 15%; a third step of holding the reaction solution heated in the second step for 30 minutes or more for dehydrating the metal complex to precipitate the metal oxide nanoparticles; and a fourth step of collecting the metal oxide nanoparticles after the metal oxide nanoparticles are cooled.

Further, it is preferable that a pH of the reaction solution is 4.0 to 6.0 in the first step.

Further, it is preferable that a holding temperature under the hermetically sealed atmosphere is 130 to 190° C. and a holding time is 12 hours or more in the third step.

Further, it is preferable that the first step includes a step of preparing a solution containing the metal complex, a step of preparing a mixed solution in which the alcohol and water are uniformly mixed, and a step of mixing the solution containing the metal complex with the mixed solution.

The method for producing metal oxide nanoparticles according to the present disclosure can stably synthesize metal oxide nanoparticles in a high yield.

DETAILED DESCRIPTION

Figure 1:
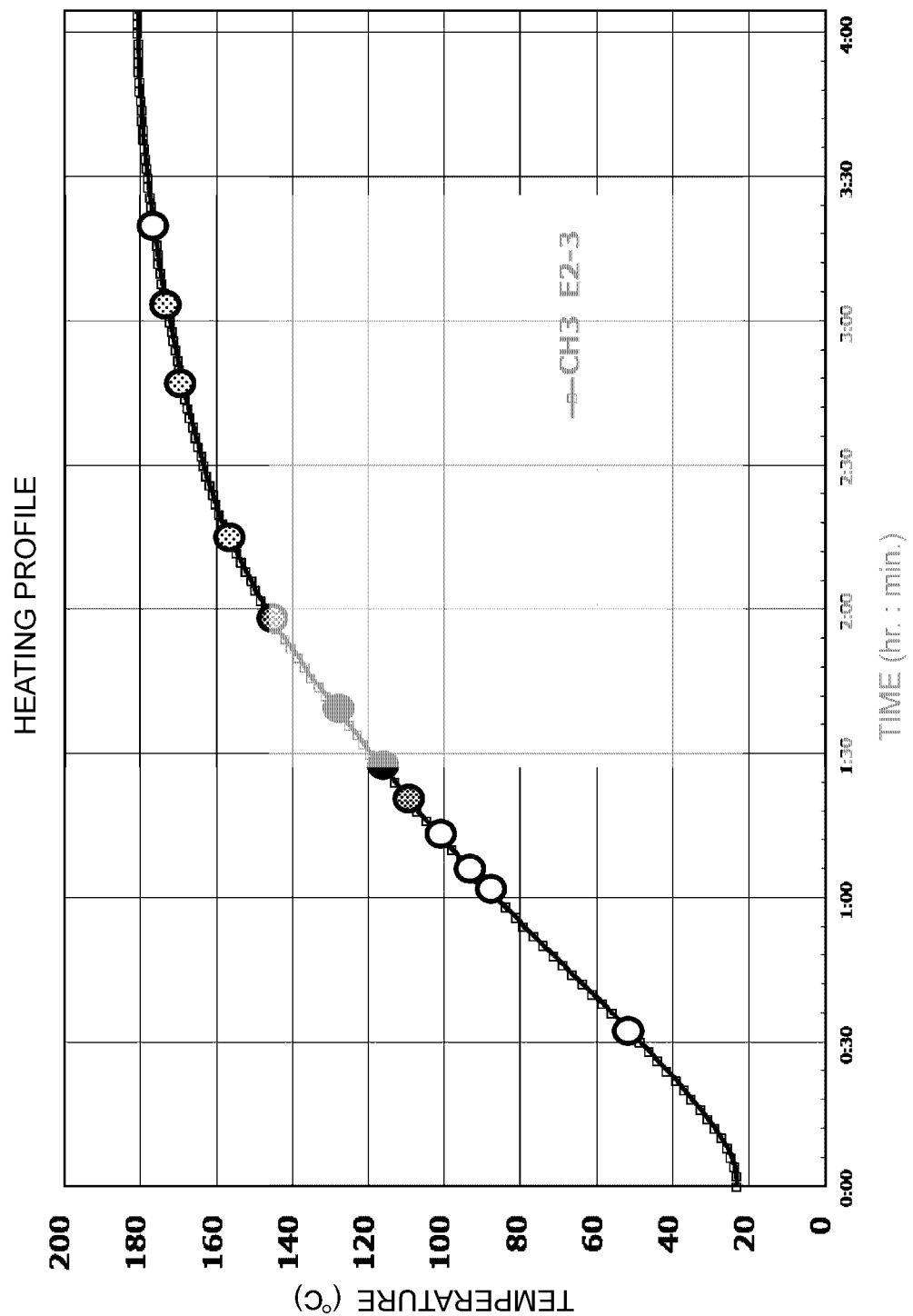
FIG. 1 is a graph illustrating the relation between the heating time and heating temperature for a reaction solution in Example 1.

Hereinafter, a preferred embodiment of a method for producing metal oxide nanoparticles of the present disclosure will be described in detail.

The method for producing metal oxide nanoparticles according to the present disclosure includes a first step of preparing a reaction solution containing a metal complex, an alcohol, and water, a second step of heating the reaction solution for phase-separation under a hermetically sealed atmosphere where the volumetric expansion ratio of the reaction solution reaches 5 to 15%, a third step of holding the reaction solution heated in the second step for 30 minutes or more for dehydrating the metal complex to precipitate the metal oxide nanoparticles, and a fourth step of collecting the metal oxide nanoparticles after the metal oxide nanoparticles are cooled.

The metal oxide nanoparticles to be obtained by the production method of the present disclosure include a metal oxide containing at least one metal. It is preferable that the at least one metal herein be at least one metal selected from the group consisting of copper, nickel, cobalt, zinc, iron, cerium, titanium, silver, palladium, molybdenum, niobium, and zirconium. Of these, it is more preferable that the metal be at least one metal selected from copper, nickel, cobalt, zinc, iron, cerium, and titanium, and it is particularly preferable that the metal be copper. Such a metal oxide containing at least one metal may be an oxide containing one metal or may be a composite oxide containing two or more metals.

The metal oxide nanoparticles to be obtained by the production method of the present disclosure are particles having a size of nanometer order, specifically have a particle size of 100 nm or less, for example, have a particle diameter of 5 to 50 nm. According to the production method of the present disclosure, it is possible to obtain not only aggregates of particles each having a different particle size, but also aggregates of particles having a uniform particle size, depending on synthesis conditions. The shape of metal oxide nanoparticles to be obtained is not particularly limited and is, for example, spherical, cuboidal (cubic), rectangular parallelepiped-shaped, rod-shaped, or linear. Particularly, it is preferable that a metal oxide nanoparticle to be obtained in the production method of the present disclosure be a single nanocrystal piece having a nanofacet structure or a nanoparticle formed by a plurality of nanocrystal pieces aggregated. With respect to the metal oxide nanoparticles to be obtained by the production method of the present disclosure, it is preferable that a plurality of nanoparticles aggregate to form nanoparticle aggregates.

1. Step of Preparing Reaction Solution (First Step)

First, a reaction solution containing a metal complex, an alcohol, and water is prepared.

The metal complex can be prepared by allowing a metal salt containing the at least one metal described above to react with a compound to be a ligand for the metal salt in an aqueous solution. Examples of the metal salt include chlorides, bromides, iodides, sulfates, acetates, and nitrates of the at least one metal described above, and the metal salt is preferably a chloride. Particularly, when the at least one metal is copper, it is preferable that the copper salt be copper (II) chloride dihydrate.

Examples of a molecule, other than water, to constitute the ligand include ammonia, urea, thiourea, thiosulfuric acid, and cyanides (hydrogen cyanide), and the molecule is preferably urea.

It is preferable that the mixing ratio (molar ratio) between the above metal salt and the compound to be the ligand be 1:2 to 1:6.

An example of a reaction solvent to be used upon preparing the metal complex includes a mixed solvent of water and an alcohol. In the case where an alcohol or water is not used as the reaction solvent, mixing the isolated metal complex with an alcohol and water after the metal complex is isolated can prepare a reaction solution containing the metal complex, the alcohol, and water. In the case where an alcohol and water are used as the reaction solvent, it is possible to prepare a reaction solution containing a metal complex, an alcohol, and water without isolating the metal complex. The reaction temperature upon preparing the metal complex is 10 to 40° C., for example.

Examples of the alcohol herein include methanol, ethanol, butanol, ethylene glycol, polyethylene glycol, isopropanol, propylene glycol, 1-propanol, 2-butanol, and 1,3-butanediol. From the viewpoint of preparing a nanocrystal piece having a good orientation by means of a dehydration reaction utilizing hydrogen bonding between a metal complex and an alcohol, it is preferable that the alcohol be a dihydric lower alcohol, particularly ethylene glycol.

From the viewpoint of obtaining a reaction solution in which the metal complex, the alcohol, and water are uniformly dissolved, it is preferable that the ratio (volume ratio) between the alcohol and water be 1:0.5 to 1:1.5. After the metal salt in the reaction solution turns into metal ions and the metal ions react with a compound to be a ligand to prepare a metal complex, the pH of the reaction solution is adjusted such that the metal complex can stably exist. In the case where the metal ions are copper ions, the pH of the reaction solution is preferably 4.0 to 6.0, more preferably 4.2 to 5.2. The pH of the reaction solution can be adjusted by, for example, adding an acid (such as hydrochloric acid and nitric acid) or an alkali (such as sodium hydroxide) to the reaction solution.

It is preferable that the concentration of the metal in the reaction solution be 0.1 to 5.0% by weight. When the concentration of the metal is less than 0.1% by weight, the weight of metal oxide nanoparticles to be obtained is extremely reduced. In contrast, when the concentration of the metal exceeds 5.0% by weight, metal oxide nanoparticles to be precipitated are coarsened, and metal oxide nanoparticles of a desired structure are unlikely to be obtained.

It is preferable that the step of preparing such a reaction solution include a step of preparing a solution containing a metal complex, a step of preparing a mixed solution in which an alcohol and water are uniformly mixed, and a step of mixing the solution containing the metal complex with the mixed solution. Separately preparing a solution containing a metal complex and a mixed solution in which an alcohol and water are uniformly mixed and thereafter, mixing the solutions leads to increase in the total amount of the solution after mixing, and dispersion of the metal complex is likely to occur in the solution. Thus, it is possible to shorten the stirring time. It is also possible to control the steps separately, in such a way that the state of the metal complex is controlled with the solution containing the metal complex, and the state of phase separation is controlled with the mixed solution in which the alcohol and water are uniformly mixed.

2. Step of Heating Reaction Solution (Second Step)

Thereafter, the reaction solution prepared in the above step is heated for phase-separation under a hermetically sealed atmosphere such that the volumetric expansion ratio of the reaction solution reaches 5 to 15%. Specifically, the heating temperature and the pressure under a hermetically sealed atmosphere are set such that the volumetric expansion ratio of the reaction solution reaches 5 to 15% by heating the reaction solution with the effect of the phase separation added.

It is preferable that the heating of the reaction solution be performed at a temperature equivalent to or higher than the temperature at which the reaction solution evaporates in the air. The "temperature at which the reaction solution evaporates in the air" changes depending on the ratio between the alcohol and water constituting the reaction solution. For example, the boiling point of ethylene glycol is 189° C., and the boiling point of water is 100° C. In the case of a mixed solution in which the ratio between ethylene glycol and water (volume ratio) is 3:2, the temperature at which the reaction solution evaporates is of the order of 120° C. At this time, it is more preferable that the heating temperature be 130 to 190° C.

The heating of the reaction solution is performed under a hermetically sealed atmosphere. The reaction solution is heated in a hermetically sealed container such as an autoclave (heating tank), for example. When the reaction solution is heated under a hermetically sealed atmosphere, the pressure in the hermetically sealed container increases in association with evaporation of the reaction solution, and a pressurized state is achieved. The pressure in the hermetically sealed container is 1 atmosphere or more, for example. Note that there is a supercritical hydrothermal synthesis method, as another method for preparing nanoparticles. A supercritical fluid is a fluid that has exceeded the critical temperature and critical pressure, and in the case of water, the critical temperature is 374° C., and the critical pressure is 22.1 MPa. In this synthesis method, the dielectric constant of water markedly changes around the critical point to increase the degree of supersaturation, and a large number of nuclei are produced at once to thereby enable nanoparticles to be synthesized. When production of nanoparticles is performed in a supercritical state by applying the supercritical hydrothermal synthesis method, it is preferable that the pressure range in the hermetically sealed container be 4 to 600 MPa. In contrast, production of the metal oxide nanoparticles of the present disclosure can be performed under a low pressure atmosphere (less than 4 MPa). Thus, use of a simple sealed container is sufficient, and control of the conditions is facile.

The reaction solution thus heated expands by 5 to 15% relative to the reaction solution before heating in terms of volumetric expansion ratio [{(volume of reaction solution on heating−volume of reaction solution before heating)/volume of reaction solution at room temperature before heating}×100(%)].

For a mixed solution composed of ethylene glycol and water, in the case where the ratio (volume ratio) between ethylene glycol and water is 1:1, the volumetric expansion ratio is known to be of the order of 4% by heating at 150° C. In contrast to this, in the case of the reaction solution, containing a metal complex, an alcohol, and water, to be used in the production method of the present disclosure, the volumetric expansion ratio increases to of the order of 10% by heating at 150° C., even if the ratio (volume ratio) between ethylene glycol and water is comparable. It is inferred that volumetric expansion that occurs in the reaction solution of the present disclosure is a different phenomenon from commonly known volumetric expansion caused by heating in a mixed system of ethylene glycol and water.

Such specific volumetric expansion is affected by the phase separation of the reaction solution. In the present disclosure, it is inferred that the phase separation of this reaction solution contributes to preparation of metal oxide nanoparticles. The volumetric expansion ratio is regarded as an indicator for generating a dehydration reaction. With a volumetric expansion ratio of less than 5%, no phase separation is observed and few nanoparticles are obtained. In view of practical volumetric expansion of a reaction solution, the upper limit of the volumetric expansion ratio is less than 15%.

Note that the phase separation referred to in the present disclosure has a meaning including mainly 2 states: visible micro phase separation, such that the reaction solution becomes clouded; and macro phase separation, in which the liquid phase is separated into two layers.

Particularly, in the production method of the present disclosure, when the reaction solution is heated, the temperature of the reaction solution itself gradually increases. In association with this, phase separation of the reaction solution begins, and clouding is started to occur in the reaction solution. Thereafter, along with the clouding of the reaction solution, specific volumetric expansion as described above occurs. Such a phase separation phenomenon is a phenomenon specific to the production method of the present disclosure. When the temperature of the reaction solution itself further increases by heating the reaction solution, the phase separation of the reaction solution further proceeds, and the clouding of the reaction solution becomes more marked. Thereafter, when the temperature of the reaction solution exceeds a certain temperature, the liquid phase is separated into two layers, and the reaction solution begins to be clarified. Thereafter, at the point where the reaction solution reaches the heating temperature, the reaction solution is completely clarified.

3. Step of Precipitating Metal Oxide Nanoparticles (Third Step)

The heated reaction solution is held for 30 minutes or more, and the metal complex is dehydrated to thereby precipitate metal oxide nanoparticles. "The heated reaction solution is held" herein means that the reaction solution heated to a predetermined temperature is held in the state by temperature control to maintain a constant temperature and pressure holding by means of hermetical sealing (under a hermetically sealed atmosphere in the hermetically sealed container or the like).

In the production method of the present disclosure, the phase separation of the reaction solution proceeds in two stages (clouding and clarifying), and thus, the dehydration reaction of the metal complex is promoted to thereby enable metal oxide nanoparticles to be stably synthesized in a high yield.

Although the mechanism of such a reaction system is not necessarily clear, the present inventors consider it as follows. That is, it is believed that the action of the phase-separation of the reaction solution becomes a driving force for a dehydration reaction to occur around the metal complex and the metal oxide nanoparticles are obtained in a high yield.

In the present step, it is preferable that the holding temperature under a hermetically sealed atmosphere described above be 130 to 190° C., and it is more preferable that the temperature be 145 to 185° C. With the holding temperature at 130 to 190° C., the pressurized state in the hermetically sealed container is maintained, and the phase separation can be promoted.

It is preferable that the holding time be 30 minutes or more, and it is more preferable that the time be 12 hours or more. With the holding time of 30 minutes or more, the dehydration reaction of the metal complex is promoted across the entire reaction solution, and the metal oxide nanoparticles can be produced efficiently. Note that the upper limit of the holding time is not particularly limited, but from the practical viewpoint, it is preferable that the upper limit be 120 hours (5 days). Particularly, as a combination of the holding temperature and holding time under a hermetically sealed atmosphere, it is preferable that the holding temperature be 130 to 190° C. and the holding time be 12 hours or more.

4. Step of Collecting Metal Oxide (Fourth Step)

After the metal oxide nanoparticles are cooled, the metal oxide nanoparticles are collected.

The solution containing the metal oxide nanoparticles precipitated is cooled to near room temperature (15 to 25° C.). The cooling method is not particularly limited. Examples of the method include a method in which natural cooling is performed while the nanoparticle solution remains provided in the heating tank, a method in which the nanoparticle solution is removed from the heating tank and air-cooled, and a method in which the nanoparticle solution is removed from the heating tank and thereafter cooled with running water.

After the cooling, the precipitated metal oxide nanoparticles (precipitate) are collected from the solution, washed, and dried to thereby obtain metal oxide nanoparticles. The washing solution can be appropriately selected, and, for example, a mixed solution of methanol and water can be used.

Particularly, in the collected precipitate, from the viewpoint of obtaining metal oxide nanoparticles in a high yield, after the hermetically sealed container after the cooling is opened, it is preferable that the precipitate be rapidly collected and washed. When the hermetically sealed container is opened, the solution contacts the air. Thus, if the precipitate is left as it is, another product different from the metal oxide nanoparticles may be produced in the solution. In order to prevent the solution from contacting the air, it is more preferable that collection of the precipitate be performed under in an inert gas atmosphere such as nitrogen and argon.

Although the embodiments of the present disclosure have been described hereinabove, the present disclosure is not limited to the embodiment described above, includes any aspects included in the concept and the claims of the present disclosure, and can be subject to various modifications within the scope of the present disclosure.

EXAMPLES

Thereafter, in order to further clarify the effect of the present disclosure, Examples and Comparative Examples will be described, but the present disclosure is not intended to be limited to these Examples.

Example 1

Figure 2:
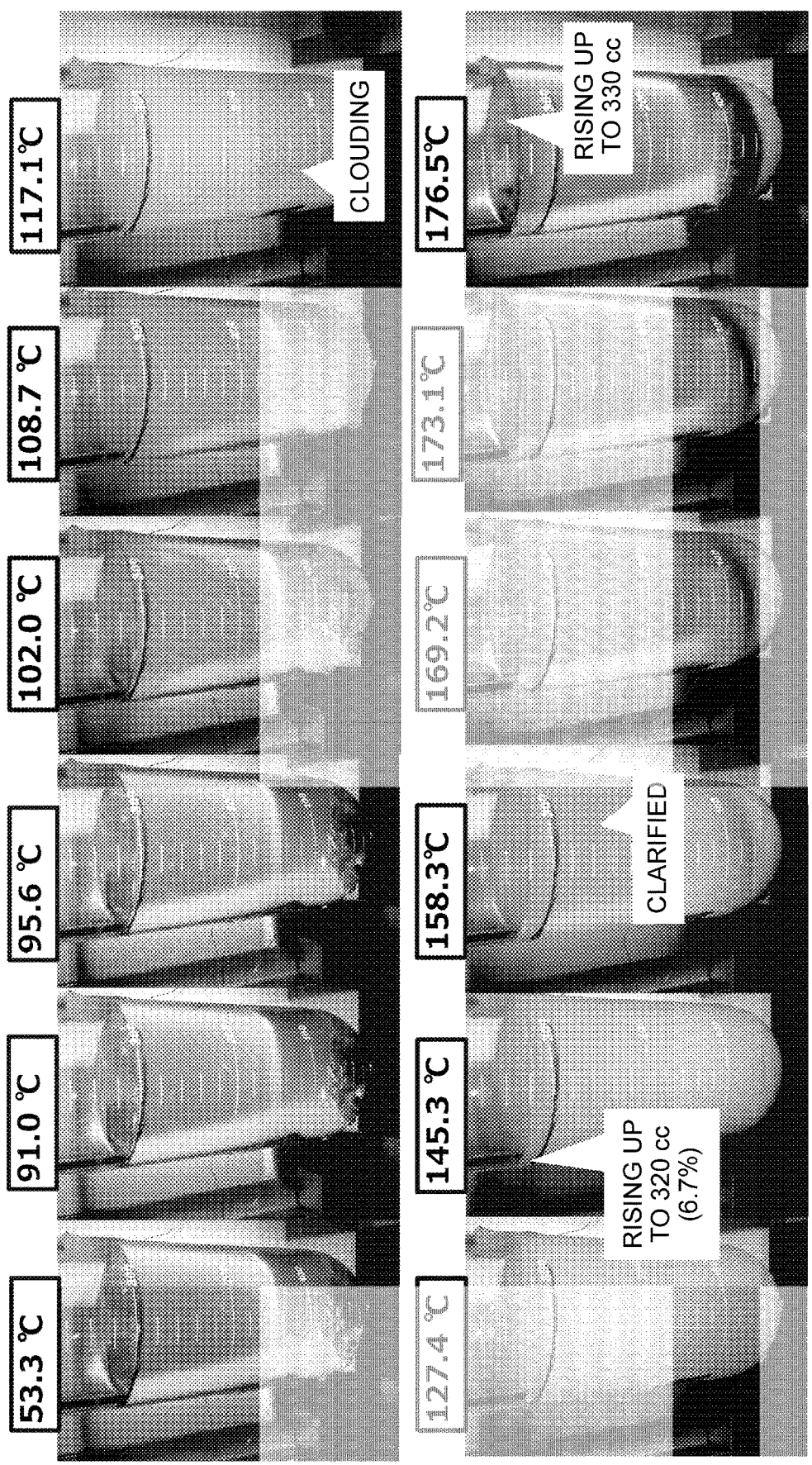
FIG. 2 is an external view of the reaction solution during heating in Example 1.

At room temperature, 180 ml of ethylene glycol and 90 ml of water were mixed and stirred for one hour. It was confirmed that the mixed solution of the ethylene glycol and water was transparent and it was concluded that the ethylene glycol and water were uniformly mixed. Meanwhile, 2.0 g of copper(II) chloride dihydrate and 1.6 g of urea were added to 30 ml of water to prepare a metal complex solution. While the mixed solution described above was stirred, the metal complex solution described above was added to the mixed solution. Dilute hydrochloric acid was further added thereto to adjust the pH to 4.5, and a reaction solution was obtained. The reaction solution obtained was injected into a pressure-resistant glass container having an internal volume of 500 ml, and the container was hermetically sealed in an air atmosphere. Since this pressure-resistant glass container is transparent, the phase separation state of the reaction solution can be confirmed during heating as well as a rise in the liquid level due to volumetric expansion of the reaction solution can be confirmed. In order to achieve complete clouding by use of convection of the solution, the reaction solution was heated from 110° C. to 150° C. over 45 minutes (see FIG. 1). In order to hold the container at 2 MPa or less during heating, a valve operation was performed as required to reduce the pressure. The reaction solution clouded due to the phase separation was clarified due to the subsequent micro phase separation, and precipitation of a metal hydrate and a metal oxide begun (see FIG. 2). The reaction solution was heated to 180° C., which was the temperature condition under which the volumetric expansion ratio of the reaction solution reached 10%, over one hour or more after the reaction solution was clouded, and held at 180° C. for 12 hours such that the entire reaction solution became clarified. Thereafter, the solution was cooled to room temperature and held at room temperature for one day, and then, the solution containing a deposit was recovered from the container. The deposit in the solution was washed with methanol and pure water. Thereafter, the deposit was dried under a vacuum environment at 70° C. for 10 hours to thereby obtain copper oxide nanoparticles.

Example 2

Copper oxide nanoparticles were obtained in the same manner as in Example 1 except that 120 ml of ethylene glycol and 180 ml of water were mixed, the reaction solution was heated from 110° C. to 140° C. over 80 minutes, and the reaction solution was held at 150° C., which was the temperature condition at which the volumetric expansion ratio of the reaction solution reached 6.7%, for 24 hours.

Example 3

Cerium oxide nanoparticles were obtained in the same manner as in Example 1 except that 120 ml of ethylene glycol and 150 ml of water were mixed, 2.6 g of cerium (III)nitrate hexahydrate and 1.4 g of urea were added to 30 ml of water to prepare a metal complex solution, dilute nitric acid was added thereto to adjust the pH to 4.5, the reaction solution was heated from 105° C. to 140° C. over 85 minutes, and the reaction solution was held at 155° C., which was the temperature condition at which the volumetric expansion ratio of the reaction solution reached 6.7%, for 24 hours.

Comparative Example 1

Copper oxide nanoparticles were obtained in the same manner as in Example 1 except that 2.0 g of copper(II) chloride dihydrate and 1.6 g of urea were added to 300 ml of water and stirred to obtain a reaction solution of which pH had been adjusted to 4.9, the reaction solution was heated from 90° C. to 125° C. over 60 minutes, and the reaction solution was held at 135° C., which was the temperature condition at which the volumetric expansion ratio of the reaction solution reached 3.9%, for 12 hours.

Comparative Example 2

Copper oxide nanoparticles were obtained in the same manner as in Comparative Example 1 except that the reaction solution was held at 180° C., which was the temperature condition at which the volumetric expansion ratio of the reaction solution reached 7.0%, for 12 hours.

Comparative Example 3

Copper oxide nanoparticles were obtained in the same manner as in Comparative Example 1 except that a reaction solution of which pH had been adjusted to 3.5 was obtained.

Comparative Example 4

Cerium oxide nanoparticles were obtained in the same manner as in Example 3 except that the reaction solution was heated from 90° C. to 125° C. over 60 minutes and the reaction solution was held at 125° C., which was the temperature condition at which the volumetric expansion ratio of the reaction solution reached 3.2%, for 12 hours.

Note that, as a reference experiment, in the case where a mixed solution containing no metal complex and composed of 40% by weight of ethylene glycol and water (40% by weight ethylene glycol aqueous solution) was heated from room temperature (about 25° C.) to about 180° C., volumetric expansion of the solution was confirmed but the solution remained clear, and no clouding was confirmed. The volumetric expansion ratio of the 40% by weight ethylene glycol aqueous solution, which was able to be confirmed in the reference experiment, is 6.7%. This is a value substantially equivalent to a volumetric expansion ratio to be converted on the basis of 0.937, which is the density of the 40% by weight ethylene glycol aqueous solution at 176° C. The density is a value in a state in which no phase separation exists. Since the value of the volumetric expansion ratio corresponded with the volumetric expansion ratio to be converted on the basis of the density, it can be said that no phase separation has occurred in this reference experiment. Accordingly, no phase separation occurs in a solution containing no metal complex and composed only of water and an alcohol, even when the solution is heated. In contrast, in a solution in which metal ions are present, phase separation due to an interaction among metal ions, water, and an alcohol occurs, and thus, it can be considered that this phase separation contributes to the preparation of metal oxide nanoparticles.

[Evaluation]

(1) Amount of Metal Oxide Nanoparticles Produced

A structural analysis was performed on the precipitate obtained by each production method according to Examples and Comparative Examples described above, using an X-ray diffractometer (manufactured by Bruker Corporation) to determine the amount of the nanoparticles produced. In Examples 1 and 2 and Comparative Examples 1 and 2, basic copper carbonate nanoparticles were produced in addition to the copper oxide nanoparticles. Thus, the amount of the copper oxide nanoparticles produced and the amount of the basic copper carbonate nanoparticles produced were determined. In Example 3, basic cerium carbonate nanoparticles were produced in addition to the cerium oxide nanoparticles. Thus, the amount of the cerium oxide nanoparticles produced and the amount of the basic cerium carbonate nanoparticles produced were determined. The amount of the metal oxide nanoparticles (copper oxide nanoparticles and cerium oxide nanoparticles) produced and the amount of the basic carbonate nanoparticles (basic copper carbonate nanoparticles and basic cerium carbonate nanoparticles) produced are shown in Table 1.

It is desirable that the amount of the metal oxide nanoparticles produced be 200 mg or more based on 2 to 3 g of the metal salt as a raw material. Accordingly, the case where the amount of the metal oxide nanoparticles produced was 200 mg or more was judged as the acceptable level, and the case where the amount was less than 200 mg was judged as the rejection level.

Even when basic carbonate nanoparticles were produced in addition to metal oxide nanoparticles, it can be judged that no practical problem exists, provided that the metal oxide nanoparticles and the basic carbonate nanoparticles can be recovered in a completely separate manner. In conventional methods for producing metal oxide nanoparticles, metal oxide nanoparticles and basic carbonate nanoparticles are produced in a mixed state, and thus, it is difficult to recover metal oxide nanoparticles and basic carbonate nanoparticles in a separate manner. In contrast, according to the method for producing metal oxide nanoparticles of the present disclosure, although metal oxide nanoparticles and basic carbonate nanoparticles respectively form metal oxide nanoparticle aggregates and basic carbonate nanoparticle aggregates, the nanoparticle aggregates of the metal oxide nanoparticles and the nanoparticle aggregates of the basic carbonate nanoparticles are different in color. For this reason, even when both types of the nanoparticle aggregates are formed, only the nanoparticle aggregates of the metal oxide nanoparticles can be easily separated and recovered, as well as highly-pure nanoparticle aggregates of the metal oxide nanoparticles can be obtained.

With respect to the purity of the nanoparticle aggregates of the metal oxide nanoparticles, after peaks were each confirmed to be peaks derived from crystals of a single structure in the structural analysis by X-ray diffraction, the nanoparticle aggregates were heated in vacuum to 1000° C. in TG-DTA/MS (differential thermal balance-mass spectrometry). The purity can be determined from the component analysis of a gas produced when the metal oxide was completely decomposed, concentration measurement, and weight change of the oxide. In any of the precipitates obtained by the production methods according to Examples and Comparative Examples, it was confirmed that the purity of the metal oxide nanoparticle aggregates and the purity of the basic carbonate nanoparticle aggregates were 99% or more, and both types of the aggregates were able to be recovered in a completely separate manner.

(2) Specific Surface Area of Metal Oxide Nanoparticles

The amount of nitrogen gas adsorbed was measured by the BET method in compliance with JIS Z 8830 using an advanced micropore size and chemisorption analyzer (trade name "AutoSorb-iQ2", manufactured by Quantachrome Instruments Japan G.K.) to calculate the specific surface area of the metal oxide nanoparticles. Note that, after vacuum deaeration of the metal oxide nanoparticles was performed at 200° C. for 3 hours as a pre-treatment, the amount of nitrogen gas adsorbed was measured. The specific surface area of the metal oxide nanoparticles ($m^2/g$) is shown in Table 1.

With respect to the particle size of the obtained metal oxide nanoparticles, it is possible to measure the actual particle size using a SEM. However, in consideration of the diversity of particle forms, whether the particle size of the obtained metal oxide nanoparticles was in a nano order or not was determined on the basis of the specific surface area. In the case where the specific surface area was 10 $m^2/g$ or more, the particle size was determined to be in a nano order, which was judged as the acceptable level, and the case of less than 10 $m^2/g$ was judged as the rejection level. Note that, in Comparative Examples 1 to 4, the amount necessary for specific surface area measurement (50 mg) could not be recovered, and thus, the results were denoted as "-" in Table 1.

TABLE 1

|  | Amount of metal oxide nanoparticles produced (mg) | Amount of basic carbonate nanoparticles produced (mg) | Specific surface area of metal oxide nanoparticles ($m^2/g$) |
| --- | --- | --- | --- |
| Example 1 | 300 | 10 | 11 |
| Example 2 | 200 | 20 | 16 |
| Example 3 | 200 | 50 | 29 |
| Comparative Example 1 | 10 | 400 | — |
| Comparative Example 2 | 20 | 10 | — |
| Comparative Example 3 | 0 | 50 | — |
| Comparative Example 4 | 0 | 200 | — |

As shown in Table 1, in Examples 1 to 3, it was possible to synthesize metal oxide nanoparticles in a high yield by preparing a reaction solution containing a metal complex, an alcohol, and water, heating the reaction solution under a hermetically sealed atmosphere such that the volumetric expansion ratio of the reaction solution reached 5 to 15% to phase-separated the reaction solution, holding the heated reaction solution for 30 minutes or more to dehydrate the metal complex to thereby precipitate metal oxide nanoparticles, cooling the solution containing the precipitated metal oxide nanoparticles, and thereafter, collecting the metal oxide nanoparticles.

In contrast, in Comparative Examples 1 and 2, no alcohol was contained in the reaction solution, and thus, the amount of the metal oxide nanoparticles produced was small. In Comparative Example 3, no alcohol was contained in the reaction solution, moreover, the pH of the reaction solution was as low as 3.5, and thus, no metal oxide nanoparticles were produced. In Comparative Example 4, alcohol was contained in the reaction solution, and it was possible to confirm volumetric expansion due to heating. However, the volumetric expansion ratio was as low as 3.2%, clouding due to phase separation was not observed, and the solution remained clear. Since the dehydration reaction was insufficient, no metal oxide nanoparticles were produced.

Consequently, it has been found that the method for producing metal oxide nanoparticles according to the present disclosure can stably synthesize metal oxide nanoparticles in a high yield.

What is claimed is:

1. A method for producing metal oxide nanoparticles comprising:
   a first step of preparing a reaction solution containing a metal complex, an alcohol, and water,
   a second step of heating the reaction solution for phase-separation under a hermetically sealed atmosphere where a volumetric expansion ratio of the reaction solution reaches 5 to 15%,
   a third step of holding the reaction solution heated in the second step for 12 hours or more for dehydrating the metal complex to precipitate the metal oxide nanoparticles, and
   a fourth step of collecting the metal oxide nanoparticles after the metal oxide nanoparticles are cooled,
   wherein the phase-separation of the reaction solution proceeds in two stages of clouding of the reaction solution and clarifying of the clouded reaction solution,
   a holding temperature under the hermetically sealed atmosphere is 130 to 190° C. in the third step,
   the metal complex is prepared by allowing a metal salt containing at least one metal to react with a compound to be a ligand for the metal salt in an aqueous solution,
   the at least one metal is selected from copper, nickel, cobalt, zinc, iron, cerium, titanium, silver, palladium, molybdenum, niobium, and zirconium, and
   the ligand includes ammonia, urea, thiourea, thiosulfuric acid or cyanides.

2. The method for producing metal oxide nanoparticles according to claim 1, wherein a pH of the reaction solution is 4.0 to 6.0 in the first step.

3. The method for producing metal oxide nanoparticles according to claim 1, wherein the first step comprises:
   a step of preparing a solution containing the metal complex,
   a step of preparing a mixed solution in which the alcohol and water are uniformly mixed, and
   a step of mixing the solution containing the metal complex with the mixed solution.

* * * * *